(12) United States Patent
Files et al.

(10) Patent No.: US 6,759,457 B2
(45) Date of Patent: Jul. 6, 2004

(54) UNIQUE COMPOSITIONS HAVING UTILITY IN RUBBER APPLICATIONS

(75) Inventors: Edmee Files, Floyds Knobs, IN (US); Thomas Hofer, Louisville, KY (US)

(73) Assignee: Zeon Chemicals, L.P., Louisville, KY (US)

(*) Notice: Subject to any disclaimer, the term of this patent is extended or adjusted under 35 U.S.C. 154(b) by 234 days.

(21) Appl. No.: 10/078,470

(22) Filed: Feb. 21, 2002

(65) Prior Publication Data

US 2003/0158299 A1 Aug. 21, 2003

(51) Int. Cl.$^7$ .............................. C08K 5/34; C08K 5/42; C08K 3/18; C08K 3/22
(52) U.S. Cl. ........................ 524/87; 524/157; 524/159; 524/424; 524/433; 252/401; 252/402
(58) Field of Search .......................... 252/401, 402; 524/87, 157, 159, 433, 424

(56) References Cited

U.S. PATENT DOCUMENTS

| | | | |
|---|---|---|---|
| 3,624,026 A | 11/1971 | Drake | 260/41 |
| 3,678,129 A | 7/1972 | Fischer | 260/859 PV |
| 3,721,645 A | 3/1973 | Zemlin | 260/45.8 N |
| 3,935,143 A | 1/1976 | Takahashi et al. | 260/23.7 R |
| 4,087,399 A | 5/1978 | Hamada et al. | 260/37 SB |
| 4,169,112 A | 9/1979 | Elmer et al. | 260/762 |
| 4,696,967 A | 9/1987 | Shedd et al. | 524/437 |
| 4,889,881 A | 12/1989 | Takao et al. | 524/91 |
| 4,920,165 A | 4/1990 | Warrach et al. | 524/91 |
| 4,983,685 A | 1/1991 | Aoshima et al. | 525/331.8 |
| 5,073,583 A | 12/1991 | Broderick | 524/91 |
| 5,246,990 A | 9/1993 | Aoshima et al. | 524/91 |
| 5,312,856 A | 5/1994 | Hert et al. | 524/297 |
| 6,503,630 B1 * | 1/2003 | Teranishi et al. | 428/429 |

FOREIGN PATENT DOCUMENTS

| | | |
|---|---|---|
| EP | 0 874 021 A1 | 10/1998 |
| JP | 55-108429 | 8/1980 |
| JP | 2001-279021 | 10/2001 |
| WO | WO 00/27770 | 5/2000 |
| WO | WO 01-74940 A1 | 10/2001 |

OTHER PUBLICATIONS

Database WPI; Derwent Publications XP002242180 & JP 56 041216 A (abstract only).
Database WPI; Derwent Publications XP002242181 & JP 05 194185 A (abstract only).
Database WPI; Derwent Publications XP002242182 & RO 88 253 A (abstract only).

* cited by examiner

*Primary Examiner*—Kriellion A. Sanders
(74) *Attorney, Agent, or Firm*—Armstrong, Kratz, Quintos, Hanson & Brooks, LLP

(57) ABSTRACT

A composition including 8-hydroxyquinaldine and an N-acyl taurate is useful in compounding elastomer compositions. Compositions are described containing elastomers such as rubbers, metal oxides, plasticizers, fillers, antioxidants and curing agents. Rubber compositions of the invention have utility in a wide variety of applications.

38 Claims, No Drawings

UNIQUE COMPOSITIONS HAVING UTILITY IN RUBBER APPLICATIONS

BACKGROUND OF THE INVENTION

The present invention relates to compositions comprising 8-hydroxyquinaldine and N-acyl taurates. particularly to compositions further comprising a polymer, and more particularly to compositions where the polymer is a rubber.

DETAILED DESCRIPTION OF THE INVENTION

The present invention, in its most general form, is a composition comprising 8-hydroxyquinaldine and an N-acyl taurate. 8-hydroxyquinaldine is also known as 8-hydroxy-2-methylquinoline. The general formula of the N-acyl taurate may be expressed as

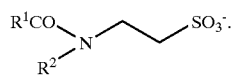
(1)

Here, the acyl group may be generally any hydrocarbon or substituted hydrocarbon group. Generally, in the N-acyl taurate, the acyl group will have in the range of 8 to 20 carbon atoms. In formula (1), this would correspond to $R^1$ having 7 to 19 carbon atoms. In the above formula, group $R^2$ may be hydrogen or an alkyl group containing 1 to 20 carbon atoms. If group $R^2$ is an alkyl group, the N-acyl taurate is, more specifically, an N-acyl-N-alkyl taurate.

Generally, the N-acyl taurate will be provided in the composition in the form of a salt, for example, a metal salt, such as the sodium salt. However, the N-acyl taurate may conceivably be provided in the acid form (N-acyl taurine).

N-acyl taurates and, more specifically, N-acyl-N-alkyl taurates are known, and one skilled in the art can make any of a wide variety of these compounds. The Examples to be described use sodium N-lauroyl-N-methyl taurate, which is commercially available, but the invention is not limited to use of this compound. Other compounds consistent with formula (1), include sodium N-oleyl taurate, sodium N-oleyl-N-methyl taurate, sodium N-cocoyl-N-methyl taurate, sodium-N-myristoyl-N-methyl taurate, sodium-N-palmitoyl-N-methyl taurate, and sodium-N-palmitoyl-N-stearyl taurate, as well as the potassium and lithium salts and other salts of these compounds.

Among the utilities of the compositions of the present invention, of particular interest is the use in elastomer compositions. Compositions comprising 8-hydroxyquinaldine and an N-acyl taurate and further comprising a base polymer may be useful elastomer compositions. Here, a base polymer may be generally any polymer, that is a material of relatively high molecular weight which is made of multiple linked units which were derived from a monomer or different monomers.

Among the base polymers which may be part of compositions of the present invention are base rubbers. Among the rubbers to which the invention is applicable are nitrile rubbers, hydrogenated nitrile rubbers, ethylene-propylene rubbers, copolymers of vinyl acetate and ethylene terpolymers of ethylene, propylene and a non-conjugated diene, natural rubbers, polybutadiene, polyisobutylene, butyl rubber, halogenated butyl rubber, copolymers of butadiene with one or more polymerizable ethylenically unsaturated monomers, such as styrene, acrylonitrile, methyl methacrylate, polyacrylates, polyethers and polymers of substituted butadienes, such as chlorobutadiene and isoprene. Mixtures of different rubbers or rubbers and plastics (e.g., nitrile rubber and polyvinyl chloride ) may, of course, also be used.

In the present invention, Examples are presented in which the base rubber is a hydrogenated initrile rubber, but other base rubbers and base polymers or elastomers may also be used in making compositions of the present invention.

In compositions of the invention comprising a base rubber, the 8-hydroxyquinaldine may be present at 0.05 to 100 parts, or more particularly at 0.1 to 30 parts, per 100 parts of base rubber (by weight). The N-acyl taurate compound may be present at 0.05 to 100 parts, or more particularly at 0.1 to 20 parts, per 100 parts of base rubber.

In addition to base polymer, compositions of the present invention may also comprise any of a variety of components commonly used in polymer compositions, as discussed below.

For example, compositions of the present invention may further comprise a metal oxide. This metal oxide may be an alkaline earth metal oxide. for example, magnesium oxide. When present. the metal oxide will generally be used at 2 to 50 parts, or more particularly at 3 to 10 parts, per 100 parts of the base rubber.

Compositions of the present invention may further comprise a filler or more than one filler. The filler may be, for example, a clay, a silica, a high-pH mineral filler. or may be a carbon black. When present, the filler will generally be used at 20 to 200 parts. or more particularly at 40 to 100 parts, per 100 parts of the base rubber.

Compositions of the present invention may further comprise a plasticizer or more than one plasticizer. Many compounds are known in the art to serve as plasticizers, for example trioctyl trimellitate. When present, the plasticizer will generally be used at 2 to 100 parts, or more particularly at 5 to 20 parts, per 100 parts of the base rubber.

Compositions of the present invention may further comprise an antioxidant, or more than one antioxidant. Many compounds are known in the art to serve as antioxidants. Examples include the amine antioxidants, such as 4,4'-bis(α,α-dimethylbenzyl)diphenylamine, and benzimidazoles, such as Zn salt of 2-mercapto 4 (5)-methylbenzimidazole. When present, the antioxidant will generally be used at 0.5 to 5 parts, or more particularly at 1 to 3 parts, per 100 parts of the base rubber.

Compositions of the present invention may also further comprise a curing (vulcanizing) agent or agents. Generally, these agents are added before a heat-treating step to cure (vulcanize) the composition. The vulcanizing agents will be chemically present in the composition before the heat-treating step, but in some cases will chemically react with the composition during the heat-treating step such that the vulcanizing agent might no longer be present after heat-curing (vulcanizing). The present invention is intended to encompass both the compositions before and after the heat-curing (vulcanizing) step. That is, even if a component in the pre-vulcanized composition (that is, before heat-curing) has fully reacted during heat-curing, the cured (vulcanized) composition can be considered to be a composition made by heat-curing the pre-cured (pre-vulcanized) composition.

Examples of curing agents or curatives (vulcanizing agents) which may be added include sulfur, sulfur donors and organic peroxides, such as α,α-bis(t-butyl peroxide) diusopropylbenzene. When present, the curative or curatives will generally be used at 1 to 15 parts, or more particularly at 1.5 to 10 parts, per 100 parts of the base rubber.

In making compositions of the present invention, a polymer composition is admixed using conventional rubber mixing equipment such as an internal mixer, 2-roll mill, extruder or the like. In one embodiment of a formulation method, all ingredients except the curing agent (or agents) are added to the mixture and mixed for several minutes or until the temperature has reached about 110 to 170° C. to make a master batch. This masterbatch is the dumped onto a cool 2-roll mill for final mixing and the curing agents are mixed in on the mill.

As an alternative, second embodiment of the formulation method, all ingredients including the curing agent (or agents) are admixed and the mixture is dumped at 90 to 120° C.

As an alternative third embodiment of the formulation method, a two-pass mix can be conducted in which the initial mix masterbatch is added back into the mixer, curative is added, and the mixture is mixed for several minutes or until the mixing temperature reaches 90 to 120° C., and then dumped to a cool finishing 2-roll mill.

After mixing, the composition may extruded or molded, and is cured by heat-treatment, typically at a temperature or temperatures in the range of 150 to 200° C.

In the process of the present invention, it is convenient to add the 8-hydroxyquinaldine to the mixture in the form of a premixture of 8-hydroxyquinaldine on a base rubber. If no other active ingredients are present, such a premixture can be considered to consist essentially of 8-hydroxyquinaldine and the base rubber. It is also possible to prepare a premixture of 8-hydroxyquinaldine and the N-acyl taurate on a base rubber, which can be considered to consist essentially of the 8-hydroxyquinaldine, the N-acyl taurate and the base rubber.

EXAMPLES OF THE INVENTION

Eight examples of the present invention arc presented in Table I. All eight examples were prepared by the following method. In all cases, the base rubber was ZETPOL 2000. a hydrogenated nitrile elastomer (HNBR) available from Zeon Chemicals, L.P.

The other components mixed with the ZETPOL 2000 were:

Carbon black, grade N774; Trioctyl trimellitate, obtained as PLASTHALL® TOTM; 4,4'-bis($\alpha$,$\alpha$-dimethylbenzyl) diphenylamine, obtained as NAUGARD 445 (Uniroyal Chemical); Sodium N-lauroyl-N-methyl taurate, obtained as NIKKOL LMT; Magnesium oxide, obtained as MAGLITE D; Zn salt of 2-mercapto 4 (5)-methylbenzimidazole, obtained as VANOX ZMTI (R.T. Vanderbilt Company, Inc.); 8-Hydroxyquinaldine, premixed with a 36% acrylonitrile hydrogenated nitrile rubber before addition; and $\alpha$,$\alpha$-bis(t-butyl peroxide) dilsopropylbenzene, obtained as VUL-CUP 40KE.

In Table I, amounts of the other components are given relative to an arbitrary 100 parts base rubber. Selected properties of the resulting compositions after curing are given in Table II.

As can be seen from the properties shown in Table II. rubber compositions of the present invention, such as those shown in Examples 1–8 of Table I, are suitable for a wide variety of uses. For example, the compositions can be molded or extruded and can be used for oil seals, gaskets, grommets, oil hoses, rollers, and other products commonly made from rubber.

TABLE I

Compositions of Examples 1 to 8

| Component | Example 1 | 2 | 3 | 4 | 5 | 6 | 7 | 8 |
|---|---|---|---|---|---|---|---|---|
| ZETPOL 2000 | 100.0 | 100.0 | 100.0 | 100.0 | 100.0 | 100.0 | 100.0 | 100.0 |
| Carbon Black N774 | 50.0 | 50.0 | 50.0 | 50.0 | 50.0 | 50.0 | 50.0 | 50.0 |
| Trioctyl trimellitate | 5.00 | 5.00 | 5.00 | 5.00 | 5.00 | 5.00 | 5.00 | 5.00 |
| 4,4'-bis($\alpha$,$\alpha$-dimethyl-benzyl)diphenylamine | 1.00 | 1.00 | 1.00 | 1.00 | 1.00 | 1.00 | 1.00 | 1.00 |
| Zn salt of 2-mercapto 4(5)-methyl-benzimidazole | 1.50 | 1.50 | 1.50 | 1.50 | 1.50 | 1.50 | 1.50 | 1.50 |
| 8-Hydroxyquinaldine | 4.50 | 3.00 | 5.40 | 1.80 | 4.50 | 3.00 | 5.40 | 1.80 |
| Sodium N-lauroyl-N-methyl taurate | 4.50 | 3.00 | 3.60 | 1.20 | 4.50 | 3.00 | 3.60 | 1.20 |
| Magnesium oxide | 5.00 | 5.00 | 5.00 | 5.00 | 3.00 | 3.00 | 3.00 | 3.00 |
| $\alpha$,$\alpha$-bis(t-butyl peroxide) diisopropylbenzene | 8.00 | 8.00 | 8.00 | 8.00 | 8.00 | 8.00 | 8.00 | 8.00 |

TABLE II

Selected physical properties of Examples 1 to 8

| Property | Example 1 | 2 | 3 | 4 | 5 | 6 | 7 | 8 |
|---|---|---|---|---|---|---|---|---|
| Original Vulcanized: | | | | | | | | |
| Hardness A (pts) | 71 | 71 | 70 | 70 | 70 | 70 | 70 | 69 |
| Tensile (psi) | 3589 | 3824 | 3632 | 3970 | 3807 | 3886 | 3751 | 3994 |
| Elongation (%) | 381 | 415 | 419 | 380 | 449 | 424 | 436 | 386 |
| Compression Set, 168 H/150° C.: | 36.9 | 34.8 | 34.8 | 31.4 | 38.3 | 36.5 | 37.7 | 31.0 |
| Aged Vulcanized AIR OVEN 168 H/150° C.: | | | | | | | | |
| Hard change A (pts) | 7 | 8 | 7 | 7 | 7 | 8 | 7 | 8 |
| Tensile change (%) | −9 | −14 | −14 | −13 | −18 | −11 | −15 | −11 |
| Elongation change (%) | 4 | −12 | −1 | −9 | −10 | −9 | −5 | −2 |
| Aged Vulcanized DEXRON III 168 H/150° C.: | | | | | | | | |
| Hard change A (pts) | −3 | −4 | −2 | −2 | −4 | −4 | −4 | −3 |
| Tensile change (%) | 0 | −7 | 1 | 2 | −1 | −1 | 2 | 1 |
| Elongation change (%) | −11 | −12 | −13 | −9 | −14 | −15 | −12 | −8 |

While the present invention has been illustrated with respect to particular embodiments, it will be understood that various changes and modifications may be made without departing from the scope of the invention.

What is claimed is:

1. A composition, comprising:
   a first compound which is an N-acyl taurate in which the acyl group has in the range of from 8 to 20 carbon atoms; and
   8-hydroxyquinaldine.
2. The composition of claim 1, further comprising:
   a base polymer.
3. The composition of claim 2, wherein said base polymer is a base rubber.
4. The composition of claim 3, wherein said base rubber is a hydrogenated nitrile rubber.
5. The composition of claim 2, wherein said first compound is an N-lauroyl-N-methyl taurate.
6. The composition of claim 5, wherein said first compound is sodium N-lauroyl-N-methyl taurate.
7. The composition of claim 3, wherein said first compound is present in a ratio, by weighty in the range of 0.1 to 20 parts of said first compound to 100 parts of said base rubber.
8. The composition of claim 3, wherein said 8-hydroxyquinaldine is present in a ratio, by weight, in the range of 0.1 to 30 parts of 8-hydroxyquinaldine to 100 parts of said base rubber.
9. The composition of claim 4, wherein said first compound is present in a ratio, by weight, in the range of 0.1 to 20 parts of said first compound to 100 parts of said base rubber.
10. The composition of claim 4, wherein said 8-hydroxyquinaldine is present in a ratio, by weight, in the range of 0.1 to 30 parts of 8-hydroxyquinaldine to 100 parts of said base rubber.
11. The composition of claim 5, wherein said first compound is present in a ratio, by weight, in the range of 0.1 to 20 parts of said first compound to 100 parts of said base rubber.
12. The composition of claim 5, wherein said 8-hydroxyquinaldine is present in a ratio, by weight, in the range of 0.1 to 30 parts of 8-hydroxyquinaldine to 100 parts of said base rubber.
13. The composition of claim 2, further comprising:
   a metal oxide.
14. The composition of claim 13, wherein said metal oxide is magnesium oxide.
15. The composition of claim 2, further comprising:
   a filler.
16. The composition of claim 15, wherein said filler is a high-pH mineral filler.
17. The composition of claim 15, wherein said filler is a carbon black.
18. The composition of claim 2, further comprising:
   a plasticizer.
19. The composition of claim 17, wherein said plasticizer is trioctyl trimellitate.
20. The composition of claim 2, further comprising a first antioxidant. said first antioxidant being an amine.
21. The composition of claim 20, wherein said first antioxidant is 4,4'-bis(α,α-dimethyl benzyl)diphenylamine.
22. The composition of claim 20, further comprising a second antioxidant.
23. The composition of claim 2, further comprising a vulcanizing agent.
24. The composition of claim 23, wherein said vulcanizing agent is an organic peroxide.
25. A rubber composition made by heat-curing the composition of claim 23 at a temperature of 150 to 200° C.
26. The composition of claim 4, further comprising:
   magnesium oxide;
   a first antioxidant, said first antioxidant being 4,4'-bis(α,α-dimethyl benzyl)diphenylamine;
   a second antioxidant;
   a carbon black;
   trioctyl trimellitate; and
   α,α-bis(t-butyl peroxide) diisopropylbenzene.
27. A rubber composition made by heat-curing the composition of claim 26 at a temperature of 150 to 200° C.
28. The composition of claim 3, said composition consisting essentially of said first compound, 8-hydroxyquinaldine and said base rubber.

29. The composition of claim 1, wherein said first compound is an N-acyl-N-alkyl taurate in which the acyl group has in the range of from 8 to 20 carbon atoms and the alkyl group has in the range of from 1 to 20 carbon atoms.

30. A process for making a rubber composition comprising the steps of:
(a) forming a mixture comprising:
   a base rubber;
   a first compound which is an N-acyl taurate in which the acyl group has in the range of from 8 to 20 carbon atoms;
   8-hydroxyquinaldine; and
   a vulcanizing agent; and
(b) heat-treating the mixture of step (a) at 150 to 200° C.

31. The process of claim 30, wherein said first compound is an N-acyl-N-alkyl taurate in which the acyl group has in the range of from 8 to 20 carbon atoms and the alkyl group has in the range of from 1 to 20 carbon atoms.

32. The process of claim 30, said base rubber being a hydrogenated nitrile rubber.

33. The process of claim 30, said first compound being an N-lauroyl-N-methyl taurate.

34. The process of claim 30, the mixture of step (a) further comprising a metal oxide.

35. The process of claim 30, said metal oxide being magnesium oxide.

36. The process of claim 30, the mixture of step (a) further comprising a filler.

37. The process of claim 36, said filler being carbon black.

38. The process of claim 30, wherein step (a) the 8-hydroxyquinaldine is added to the mixture in the form of a premixture of hydroxyquinaldine and a second rubber.

* * * * *